United States Patent [19]
Burckhardt

[11] 3,890,996
[45] June 24, 1975

[54] INSTALLATION FOR FILLING SEVERAL PRESSURE RESERVOIRS, ESPECIALLY IN MOTOR VEHICLES

[75] Inventor: Manfred H. Burckhardt, Waiblingen, Germany

[73] Assignee: Daimler-Benz Aktiengesellschaft, Germany

[22] Filed: Mar. 12, 1973

[21] Appl. No.: 339,990

[30] Foreign Application Priority Data
Mar. 10, 1972 Germany.............................. 2211561

[52] U.S. Cl. .................. 137/119; 60/416; 137/121; 180/79.2 R
[51] Int. Cl. .......................................... G05d 11/02
[58] Field of Search.......... 180/79.2 R; 60/416, 413; 137/121, 119

[56] References Cited
UNITED STATES PATENTS
2,622,400   12/1952   Greer..................................... 60/413
3,496,879   2/1970    Brandes................................ 60/413

*Primary Examiner*—Kenneth H. Betts
*Assistant Examiner*—John A. Pekar
*Attorney, Agent, or Firm*—Craig & Antonelli

[57] ABSTRACT

An installation for controlling the supply of fluid to a plurality of pressure reservoirs associated with respective vehicle fluid operating systems such as brake cycles, suspension systems, etc. A common supply pipe is connected between a pump and storage tank to supply fluid to a plurality of reservoirs by way of check valves positioned between the supply pipe and each of the reservoirs. A switching valve is interposed in a return line between the supply pipe and the storage tank. During normal operations with the reservoirs all being full and under desired operating pressures, the switching valve is open so that the fluid is pumped in a circuit bypassing the reservoirs by way of the return line back to the storage tank. A control conduit is also connected to the return line and to the switching valve in such a manner that a pressure drop in one or more of the reservoirs closes off the control conduit with a resultant build-up of back pressure at the switching valve to switch the valve into a blocking position with a resultant closing off of the return line and supply of fluid to the feed pipe leading to the reservoirs. A further modification includes a second switching valve for separating the feed pipe and associated reservoirs into preferred and non-preferred sections. This second switching valve is positioned so as to selectively block the flow in the feed pipe lines to the non-preferred section in response to failure of any of the reservoirs in the preferred section. A further modification includes a flow divider valve for equalizing the flow to a pair of reservoirs. Also, warning devices responsive to movement of the switching valve and movement of the divider, as well as to pressure changes in the reservoirs, are arranged for providing appropriate warning signals to a vehicle operator.

41 Claims, 3 Drawing Figures

PATENTED JUN 24 1975 3,890,996

SHEET 1

3,890,996

INSTALLATION FOR FILLING SEVERAL PRESSURE RESERVOIRS, ESPECIALLY IN MOTOR VEHICLES

BACKGROUND AND SUMMARY OF THE INVENTION

This invention relates to an installation for the filling of a plurality of pressure reservoirs associated with different pressure cycles, especially brake cycles, power mechanism, suspension system, or the like, in automotive vehicles.

Central hydraulic systems are becoming and will become of everincreasing importance in automobiles. In such systems, as contemplated by the present invention, a connection between a common storage tank and a plurality of pressure cycles is established. For example, these pressure cycles could be arranged for supplying fluid pressure to the energy-storage brake, the suspension system, or the power steering mechanism, and optionally also on a hydraulic comfortization system.

In all these cases, there is the problem of flawlessly executing the sequence of priority of the individual pressure cycle assemblies and the control thereof. It is contemplated by the present invention that several pressure reservoirs will be provided one each for a respective pressure cycle. These reservoirs will then be differentiated with respect to their sequential importance in the overall operation of the vehicle. Such a sequence of priority could be as follows to optimize the safety of operation of the vehicle:

1. Power steering mechanism and brake.
2. Suspension system.
3. Hydraulic comfortization system.

This above listed sequence is premised on the assumption that the power steering and braking functions are more critical to the safety of the vehicle than either of the hydraulic suspension system and the hydraulic comfortization system and on the assumption that the suspension system is more critical to safety than the hydraulic comfortization system. This priority sequence could be further subdivided between the steering and brake system.

The present invention further contemplates solving the problems of ensuring the filling of the individual pressure reservoirs and considering, in this procedure, also the above-mentioned priority sequence.

The present invention contemplates solving the above-mentioned problems by providing that each reservoir is connected, via a check valve, to a common filling pipe supplied by a pump, and that a return line is connected to this filling pipe, which return line leads to the storage tank and can be blocked off by a switching or changeover valve. This switching valve, on the one hand, can be moved into its open position by the pressure in the filling pipe and, on the other hand, can be moved into its blocking position against this pressure by means of a counterpressure which is built up in said return line in response in the pressure drop in at least one of the reservoirs.

This just described arrangement has the advantage that each reservoir, wherein the pressure drops, blocks the return line and thus initiates the filling step.

In a preferred embodiment of the present invention, it is suggested that a control conduit be connected to the return line upstream of the switching valve, which control conduit leads, with a first branch, to the rear side of the switching valve and, with a second branch, via respectively one stop slide valve associated with each reservoir back into the storage tank. The arrangement is such, according to this invention, that each stop slide valve is movable by spring force into its blocking position and, by means of a connection line due to the pressure in the associated reservoir, into its unblocking position. Furthermore, it is suggested to arrange a throttle in the first branch of the control conduit.

This arrangement has the additional advantage that the switching or changeover valve, as well as the stop slide valves and the throttle, can be combined structurally. In this way, a compact and readily producible component is obtained which operates reliably and has a long lifetime. In another preferred embodiment of the invention, the filling pipe and associated reservoirs are divided into a preferred section and an unpreferred section by means of a second switching valve. The control conduit of this second valve is connected with its first branch to the preferred section of the filling pipe and with its second branch leads back into the storage tank via respectively one stop slide valve associated with each preferred reservoir in said preferred section. The present invention further contemplates that the stop slide valves in the second branches of the first and second control conduits are combined as respectively one common slide valve associated with each preferred reservoir. Each of these common slide valves can be moved by spring force into its blocking position and, by means of a connection line by the pressure in the associated reservoir, into its unblocking position. Here again, according to another suggestion of this invention, a throttle can be arranged in the first branch of the second control conduit. This arrangement has the advantage that in any event the preferred pressure reservoirs are filled first. Only after these have been filled, the unpreferred pressure reservoirs will also be replenished so that, in case of any leakage therein, there will be no loss of pressure medium during the filling operation.

In a further preferred embodiment of the invention, the connection conduits between two reservoirs of equal status (of equal importance or priority in the overall hydraulic system) and the filling pipe or a part thereof are extended via a flow divider and respectively one regulating throttle. This flow divider assures a balancing filling of the two reservoirs. The flow divider of this arrangement is formed by a piston valve with two control edges, which valve is charged on both end faces with the same spring forces and with the pressure in the filling pipe, reduced via the respective regulating throttles. This arrangement according to the invention achieves the additional advantage that both reservoirs are filled uniformly. If a larger leakage exists in one of the two pressure cycles, the flow divider is shifted to such an extent that it exerts an almost complete throttling action. This accomplishes the objective, in any event, that the important, unaffected cycle is always entirely filled.

The present invention further contemplates providing that a warning device is connected to the flow divider which emits a signal in case the flow divider is not in equilibrium. Another feature contemplated by this invention is the arrangement of a warning device at the switching valve (or valves) which, when the valve (or valves) is closed, can be placed into readiness and can be triggered by pickup means for the pressure difference at the reservoirs, if this pressure difference is zero or negative. With this last-mentioned feature, the driver or the person monitoring the installation is alerted in time to disturbances in the system and can thus provide a remedy and/or interrupt the driving so that accidents can be avoided.

The above-mentioned and further objects, features and advantages of the present invention will become more obvious from the following description when taken in connection with the accompanying drawing which shows, for purposes of illustration only, several embodiments in accordance with the present invention.

DETAILED DESCRIPTION OF THE DRAWINGS

Figure 1:
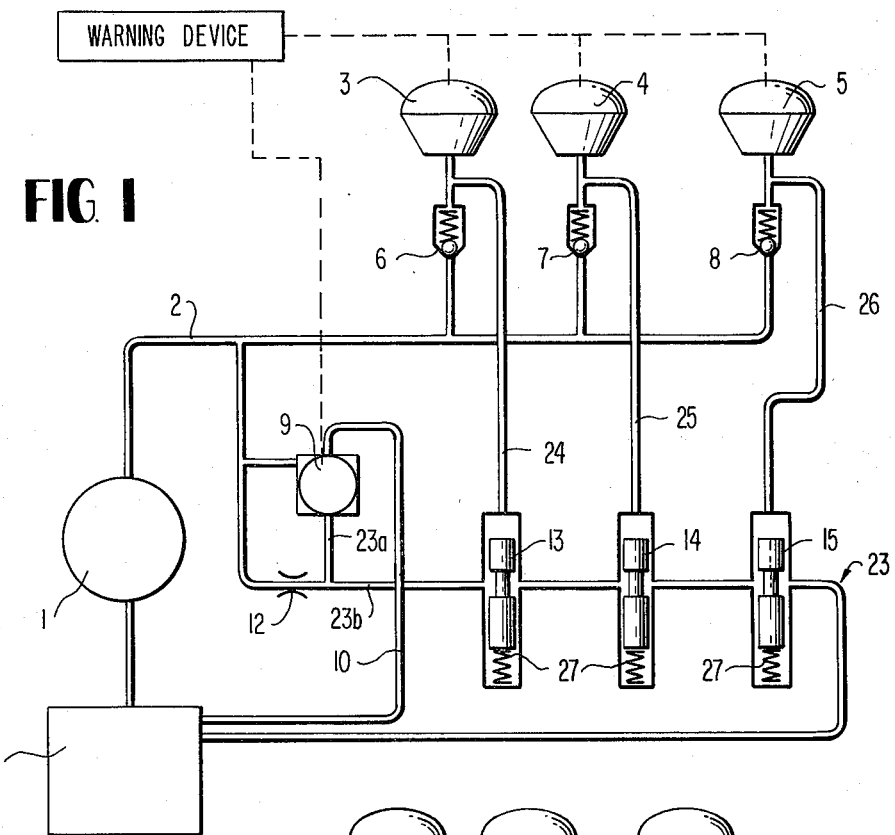
FIG. 1 schematically shows the construction of a system for an energy-storage brake and a suspension mechanism for an automotive vehicle in accordance with a preferred embodiment of the present invention.

In the system of the invention illustrated in FIG. 1, a filling pipe 2 is fed by means of an oil pump 1. Three equal priority pressure reservoirs 3, 4, and 5 are connected, via check valves 6, 7 and 8, respectively, to the filling pipe 2. In this connection, the reservoir 3 is intended for a first vehicle brake cycle, the reservoir 4 is intended for a second vehicle brake cycle, and the reservoir 5 for a vehicle suspension system. A return line 10 is connected to the filling pipe 2 and terminates in a storage tank 11. The return line 10 is selectively blocked by a switching valve 9, which switching valve is fashioned as a ball valve. Since ball switching valves of known construction can be used in conjunction with the present invention, the details of this valve 9 and the later referred to valve 18 are dispensed with herein. The switching valve 9 is movable into its unblocking position by the pressure in the filling pipe 2. A control conduit 23 is associated with the switching valve 9 with the first branch 23a of this control conduit leading to the rear side of the switching valve 9. In the second branch 23b of this control conduit 23, three stop slide valves 13, 14 and 15 are disposed, each of which is associated with a reservoir 3, 4 and 5. A throttle 12 in the branch 23b of the control conduit provides an appropriate pressure gradient. The three stop slide valves 13, 14 and 15 are connected to the reservoirs 3, 4 and 5 by means of conduits 24, 25 and 26. The stop slide valves are moved into their unblocking position by the pressure in these reservoirs, against the force of their springs 27.

The mode of operation of this installation is as follows: If all reservoirs 3, 4, and 5 have sufficient pressure, the stop slide valves are in the illustrated position. The rear side of the switching valve 9 is in communication with the storage tank 11 via the control conduit 23 such that no pressure is applied thereto and the pressure in line 2 maintains valve 9 open and the pump 1 executes the coneying step practically without pressure via the return line 10 back into the storage tank 11. If, now, the pressure drops in a reservoir, e.g., in reservoir 3, for some reason, the stop slide valve 13 closes the control conduit 23. With control conduit 23 closed, pressure is built up at the rear side of the switching valve 9 via the first branch 23a of the control conduit 23, and the valve 9 closes. Now, the pump 1 builds up pressure in the filling pipe 2, and the reservoir 3 is filled until the stop slide valve 13 is closed again due to the pressure in reservoir 3 and line 24.

Figure 2:
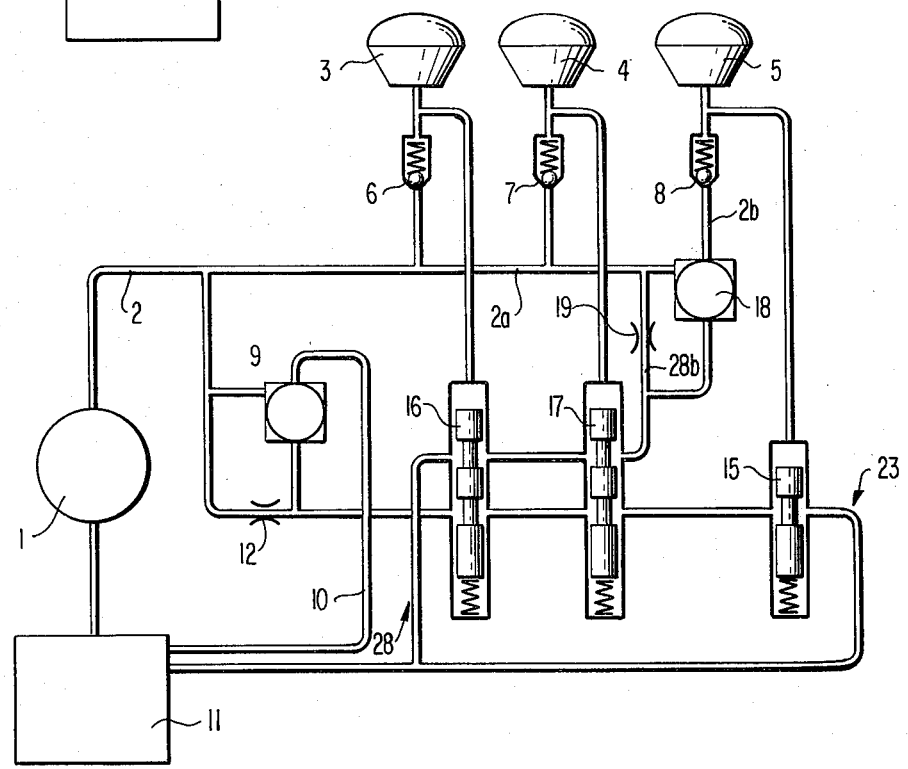
FIG. 2 schematically shows a system in accordance with the present invention similar to the system illustrated in FIG. 1, but with the preference given to the brake cycles.

The system of the invention illustrated in FIG. 2 differs from the system of FIG. 1 in that the filling pipe 2 is subdivided, by a second switching valve 18, into a preferred section 2a and an unpreferred section 2b. In the latter unpreferred section 2b, the reservoir 5 is arranged for the suspension system, and the association of the stop slide valve 15 with this reservoir is similar to the association of valve 15 and reservoir 5 as has been described above for the FIG. 1 system. A control conduit 28 is connected with the second switching valve 18, this control conduit 28 being operatively connected to control valve 18 in a similar manner as described above for the control conduit 23 and valve 9. Also in this second control conduit 28, a throttle 19 is provided. The second branch 28b of the second control conduit 28 is extended via stop slide valves 16 and 17 correlated with the reservoirs 3 and 4 of the braking cycles. These stop slide valves 16 and 17 are fashioned as double-piston slide valves and are combined with stop slide valves corresponding to valves 13 and 14 of FIG. 1 to also control the first control conduit 23.

The mode of operation of this arrangement is as follows: If the pressure drops in a braking cycle, for example, in reservoir 3, the stop slide valve 16 blocks both control conduits 23 and 28. In this manner, pressure is built up on the rear sides of both switching valves 9 and 18, so that these valves 9 and 18 are closed. The pump then builds up pressure only in the preferred section 2a of the filling pipe 2, while the unpreferred section 2b is cut off by valve 18. The reservoir 3 is filled in this manner until the stop slide valve 16 is opened again. The unpreferred reservoir 5 remains out of consideration during this procedure until after full pressure has been restored to all preferred reservoirs.

In contrast thereto, if the pressure drops in the unpreferred reservoir 5, the stop slide valve 15 blocks the control conduit 23. The switching valve 9 is now closed, whereas the switching valve 18 remains open. In the filling pipe 2, the pressure is now built up also in the unpreferred section 2b, so that the reservoir 5 is filled. However, during this step, the reservoirs 3 and 4 are likewise connected, so that first of all these last-mentioned reservoirs 3 and 4 are likewise filled—in case the pressure therein has dropped somewhat.

Figure 3:
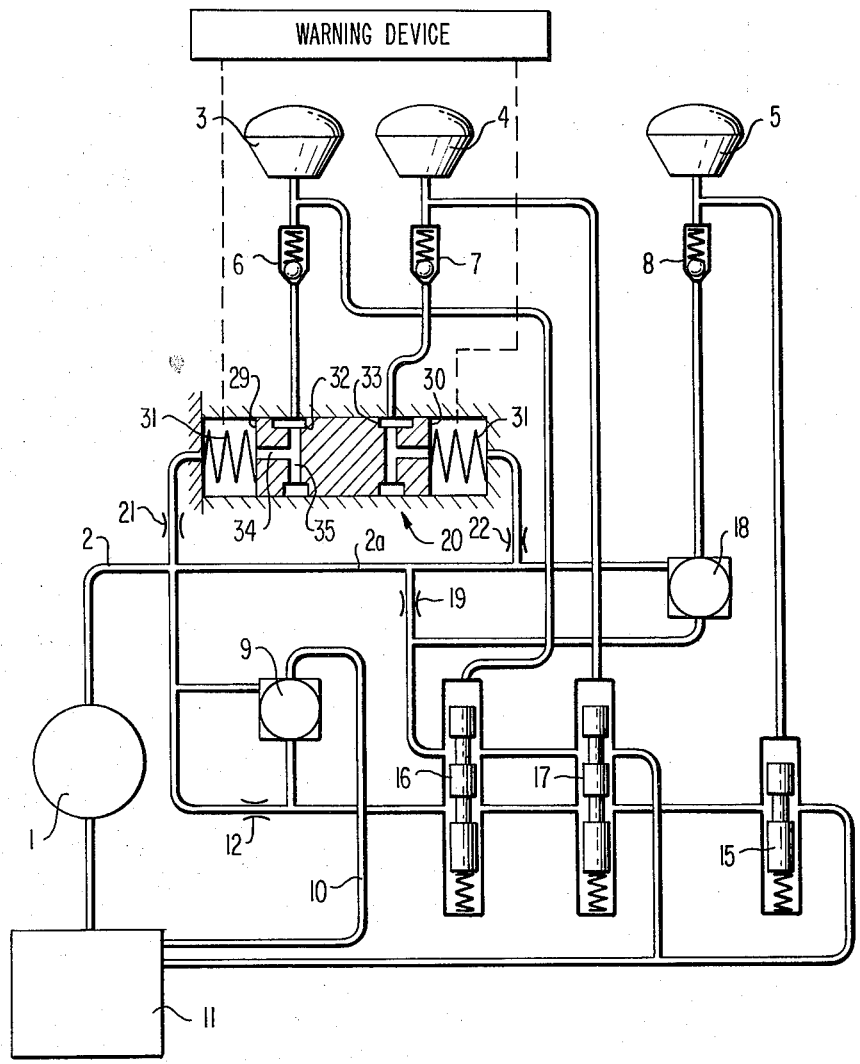
FIG. 3 schematically shows a system in accordance with the present invention to the system of FIG. 2 and with a flow divider between the two brake cycles.

In the system of the invention illustrated in FIG. 3, the reservoirs 2 and 4 are connected to the preferred section 2a of the filling pipe via a flow divider 20 and two control throttles 21 and 22. The construction of this system otherwise corresponds in all parts to that of FIG. 2. The flow divider 20 is a dual-acting piston slide valve. The end faces 29 and 30 of this flow divider are under the effect of identical springs 31. The piston slide valve has two control edges 32 and 33 to which the pressure medium is fed from the end faces via the regulating throttles 21 and 22 and the bores 34 and 35 in the piston slide valve.

The mode of operation is as follows: During the filling of the reservoirs 3 and 4, a pressure drop occurs at the throttles 21 and 22, respectively, which becomes the larger, the greater the quantity of the medium passing through at that instant. Thereby, a differential force is produced at the piston slide valve of the flow divider 20 which displaces the piston in such a manner that the side having the large throughflow is throttled. In this way, the advantage is achieved that both reservoirs are always filled uniformly. If a greater leakage exists in one of the two brake cycles, the flow divider 20 is displaced to such an extent that it exerts an almost complete throttling action. In this manner, the objective is achieved that the unaffected brake cycle is always completely filled.

A warning arrangement for warning the vehicle operator of pressure drops in one or more of the reservoirs is also contemplated by the present invention. This warning arrangement includes a warning device operatively connected to said switching valves to detect movement thereof and to provide a warning signal in response to valve movement related to a failure in pressure drop in one or more of the reservoirs (see FIG. 1). This warning signal is then transmitted via electrical means or otherwise to warn the vehicle operator by activating a warning light, warning sounding means such as a bell, or other indicating means. This warning arrangement may also include means for detecting imbalance in said divider valve 20 by way of switch means or the like operable by movement of valve 20 (see FIG. 3). Also, pressure sensors may be provided in lines communicating with the reservoirs, with appropriate pressure indicating means for the vehicle driver.

While I have shown and described only several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein only schematically but intend to cover all such changes and modifications.

I claim:

1. An installation for filling a plurality of fluid pressure reservoirs which supply different pressure cycles associated with automotive vehicle operations and the like; said installation comprising:
   common filling pipe means leading to all of said reservoirs by way of a check valve means between each reservoir and said filling pipe means,
   storage tank means,
   pump means for pumping fluid from said storage tank means to said filling pipe means,
   return line means connected between said filling pipe means and said storage tank means,
   switching valve means in said return line means for selectively blocking said return line means,
   and control means for each reservoir for moving said switching valve means to a blocking position in response to a pressure drop in at least a corresponding one of the reservoirs.

2. An installation according to claim 1, wherein said return line means is in bypassing relationship to said reservoirs such that movement of said switching valve means to said blocking position results in increased pressure and consequent fluid supply in said filling pipe means leading to said reservoirs.

3. An installation for filling a plurality of fluid pressure reservoirs which supply different pressure cycles associated with automotive vehicle operations and the like; said installation comprising:
   common filling pipe means leading to all of said reservoirs by way of a check valve means between each reservoir and said filling pipe means,
   storage tank means,
   pump means for pumping fluid from said storage tank means to said filling pipe means,
   return line means connected between said filling pipe means and said storage tank means,
   switching valve means in said return line means for selectively blocking said return line means,
   and control means for moving said switching valve means to a blocking position in response to a pressure drop in at least one of the reservoirs,
   wherein said return line means is in bypassing relationship to said reservoirs such that movement of said switching valve means to said blocking position results in increased pressure and consequent fluid supply in said filling pipe means leading to said reservoirs, and
   wherein said control means includes means for causing a counterpressure build up in a line leading to said switching valve means in response to said pressure drop in said at leat one of the reservoirs, said counterpressure build up being effective to move said switching valve means to said blocking position, said switching valve means being maintained in an open position by the pressure in said return line means when said reservoirs are filled and maintained at desired operating pressures.

4. An installation for filling a plurality of fluid pressure reservoirs which supply different pressure cycles associated with automotive vehicle operations and the like; said installation comprising:
   common filling pipe means leading to all of said reservoirs by way of a check valve means between said reservoir and said filling pipe means,
   storage tank means,
   pump means for pumping fluid from said storage tank means to said filling pipe means,
   return line means connected between said filling pipe means and said storage tank means,
   switching valve means in said return line means for selectively blocking said return line means,
   and control means for moving said switching valve means to a blocking position in response to a pressure drop in at least one of the reservoirs,
   wherein said return line means is in bypassing relationship to said reservoirs such that movement of said switching valve means to said blocking position results in increased pressure and consequent fluid supply in said filling pipe means leading to said reservoirs,
   wherein said control means includes a control conduit connected to the return line means upstream of the switching valve means, a first branch of said control conduit leading to a rear side of the switching valve means and a second branch of said control conduit leading into said storage tank means by way of stop slide valve means controlled by the pressure in said at least one of the reservoirs, said stop slide valve means being movable into a position blocking said second branch in response to reduction in pressure in said at least one of the reservoirs, and
   wherein blockage of said second branch by said stop slide valve means results in a counterpressure build up in said first branch which moves said switching valve means to said blocking position.

5. An installation according to claim 4, wherein said drop slide valve means includes a stop slide valve associated with each of the reservoirs, each of said stop slide valves being biased toward a position blocking said second branch by resilient means, and wherein a connection line is provided between each stop slide valve and associated reservoir for communicating respective reservoir pressures to said respective stop slide valves such that said reservoir pressures move said stop slide valves toward unblocking positions when said reservoirs are filled to normal desired pressures.

6. An installation according to claim 5, wherein throttle means are arranged in said control conduit between said return line means and the connection of said first branch to said switching valve means.

7. An installation according to claim 5, further comprising a second switching valve means arranged in said filling pipe means for dividing said filling pipe means and associated reservoirs into preferred and non-preferred sections, and a second control conduit for controlling said second switching valve means, said second control conduit including a first branch connected to the preferred section of the filling pipe means and a second branch leading to said storage tank means by way of respective stop slide valves associated with each of the reservoirs in the preferred section, wherein said first branch of said second control conduit and said second switching valve means communicate said preferred and non-preferred sections during normal operations with filled reservoirs, and wherein said stop slide valves in said second branch of said second control conduit are moved to their blocking positions in response to a pressure drop in respective ones of the reservoirs in said preferred section thereby causing a counterpressure which moves said second switching valve means to a blocking position to prevent further supply of fluid to reservoirs in said non-preferred section until the pressure has been restored to the preferred section.

8. An installation according to claim 7, wherein the stop slide valves for each reservoir in said preferred section are constructed as respective unitary stop slide valves for blocking flow in both said first and second control conduits in response to a pressure drop in a respective reservoir.

9. An installation according to claim 8, wherein a throttle is disposed in the first branch of the second control conduit between said filling pipe means and a control pressure inlet to said second switching valve means.

10. An installation according to claim 7, wherein a throttle is disposed in the first branch of the second control conduit between said filling pipe means and a control pressure inlet to said second switching valve means.

11. An installation according to claim 7, wherein a first and second of said reservoirs are connected to said filling pipe means by respective separate first and second connecting lines, wherein a flow divider is interposed between said first and second connecting lines to equalize the flow therein, and wherein a regulating throttle is positioned in each of said first and second connecting lines.

12. An installation according to claim 11, wherein said flow divider is formed by a piston slide valve with two separate control edges for controlling the flow through said respective first and second connecting lines, movement of said piston slide valve being controlled by the pressure in said first and second connecting lines so as to equalize the flow in said first and second connecting lines.

13. An installation according to claim 12, wherein a first end face of said piston slide valve is in communication with said first connecting line by way of the associated regulating throttle, wherein a second oppositely facing end face of said piston slide valve is in communication with said second connecting line by way of the associated regulating throttle, and wherein said piston slide valve is maintained in a central position by similar spring means acting on said first and second end faces.

14. An installation according to claim 13, wherein the stop slide valves for each reservoir in said preferred section are constructed as respective unitary stop slide valves for blocking flow in both said first and second control conduits in response to a pressure drop in a respective reservoir.

15. An installation according to claim 14, further comprising a warning device connected to the flow divider and including means emitting a warning signal if the flow divider loses its equilibrium.

16. An installation according to claim 11, wherein a warning device is provided at the switching valve means which can be switched into a readiness condition when the switching valve means is in a closed blocking position and which can be triggered by means of pick-up devices for the pressure differences in the reservoirs, if this difference is zero or negative.

17. An installation according to claim 11, wherein at least one of said reservoirs supplies a brake cycle of an automotive vehicle, and wherein at least one other of said reservoirs supplies a vehicle suspension system.

18. An installation according to claim 5, wherein a warning device is provided at the switching valve means which includes means for emitting a warning signal in response to movement of the switching valve means to the blocking position.

19. An installation according to claim 7, wherein at least one of said reservoirs supplies a brake cycle of an automotive vehicle, and wherein at least one other of said reservoirs supplies a vehicle suspension system.

20. An installation according to claim 4, wherein throttle means are arranged in said control conduit between said return line means and the connection of said first branch to said switching valve means.

21. An installation according to claim 4, further comprising a second switching valve means arranged in said filling pipe means for dividing said filling pipe means and associated reservoirs into preferred and non-preferred sections, and a second control conduit for controlling said second switching valve means, said second control conduit including a first branch connected to the preferred section of the filling pipe means and a second branch leading to said storage tank means by way of respective stop slide valves associated with each of the reservoirs in the preferred section, wherein said first branch of said second control conduit and said second switching valve means communicate said preferred and non-preferred sections during normal operations with filled reservoirs, and wherein said stop slide valves in said second branch of said second control conduit are moved to their blocking positions in response to a pressure drop in respective ones of the reservoirs in said preferred section thereby causing a counterpressure which moves said second switching valve means to a blocking position to prevent further supply of fluid to reservoirs in said non-preferred section until the pressure has been restored in the preferred section.

22. An installation according to claim 21, wherein the stop slide valves for each reservoir in said preferred section are constructed as respective unitary stop slide valves for blocking flow in both said first and second control conduits in response to a pressure drop in a respective reservoir.

23. An installation according to claim 22, wherein a throttle is disposed in the first branch of the second control conduit between said filling pipe means and a control pressure inlet to said second switching valve means.

24. An installation according to claim 4, wherein a first and second of said reservoirs are connected to said filling pipe means by respective separate first and second connecting lines, wherein a flow divider is interposed between said first and second connecting lines to equalize the flow therein, and wherein a regulating throttle is positioned in each of said first and second connecting lines.

25. An installation according to claim 24, wherein said flow divider is formed by a piston slide valve with two separate control edges for controlling the flow through said respective first and second connecting lines, movement of said piston slide valve being controlled by the pressure in said first and second connecting lines so as to equalize the flow in said first and second connecting lines.

26. An installation according to claim 25, wherein a first end face of said piston slide valve is in communication with said first connecting line by way of the associated regulating throttle, wherein a second oppositely facing end face of said piston slide valve is in communication with said second connecting line by way of the associated regulating throttle, and wherein said piston slide vave is maintained in a central position by similar spring means acting on said first and second end faces.

27. An installation according to claim 24, further comprising a warning device connected to the flow divider and including means emitting a warning signal if the flow divider loses its equilibrium.

28. An installation for filling a plurality of fluid pressure reservoirs which supply different pressure cycles associated with automotive vehicle operations and the like; said installation comprising:
common filling pipe means leading to all of said reservoirs by way of a check valve means between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response to a pressure drop in at least one of the reservoirs,
wherein said return line means is in bypassing relationship to said reservoirs such that movement of said switching valve means to said blocking position results in increased pressure and consequent fluid supply in said filling pipe means leading to said reservoirs,
wherein said installation further comprises a second switching valve means arranged in said filling means for dividing said filling pipe means and associated reservoirs into preferred and non-preferred sections, and a second control conduit for controlling said second switching valve means, said second control conduit including a first branch connected to the preferred section of the filling pipe means and a second branch leading to said storage tank means by way of respective stop slide valves associated with each of the reservoirs in the preferred section,
wherein said first branch of said second control conduit and said second switching valve means communicate said preferred and non-preferred sections during normal operations with filled reservoirs, and
wherein said stop slide velves in said second branch of said second control conduit are moved to their blocking positions in response to a pressure drop in respective ones of the reservoirs in said preferred section thereby causing a counterpressure which moves said second switching valve means to a blocking position to prevent further supply of fluid to reservoirs in said non-preferred section until the pressure has been restored to the preferred section.

29. An installation according to claim 28, wherein said control means includes means for causing a counterpressure build up in a line leading to said switching valve means in response to said pressure drop in said at least one of the reservoirs, said counterpressure build up being effective to move said switching valve means to said blocking position, said switching valve means being maintained in an open position by the pressure in said return line means when said reservoirs are filled and maintained at desired operating pressures.

30. An installation according to claim 28, wherein a throttle is disposed in the first branch of the second control conduit between said filling pipe means and a control pressure inlet to said second switching valve means.

31. An installation according to claim 28, wherein said preferred section includes at least one reservoir supplying a brake cycle for an automotive vehicle, and wherein said non-preferred section includes at least one reservoir supplying a vehicle suspension system.

32. An installation for filling a plurality of fluid pressure reservoirs which supply different pressure cycles associated with automotive vehicle operations and the like; said installation comprising:
common filling pipe means leading to all of said reservoirs by way of a check valve means between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for removing said switching valve means to a blocking position in response to a pressure drop in at least one of the reservoirs,
wherein said return line means is in bypassing relationship to said reservoirs such that movement of said switching valve means to said blocking position results in increased pressure and consequent fluid supply in said filling pipe means leading to said reservoirs, wherein a first and second of said reservoirs are connected to said filling pipe means by respective separate first and second connecting lines, wherein a flow divider is interposed between said first and second connecting lines to equalize the flow therein, and wherein a regulating throttle is positioned in each of said first and second connecting lines.

33. An installation according to claim 32, wherein said flow divider is formed by a piston slide valve with two separate control edges for controlling the flow through said respective first and second connecting lines, movement of said piston slide valve being controlled by the pressure in said first and second connecting lines so as to equalize the flow in said first and second connecting lines.

34. An installation according to claim 33, wherein a first end face of said piston slide valve is in communication with said first connecting line by way of the associated regulating throttle, wherein a second oppositely facing end face of said piston slide valve is in communication with said second connecting line by way of the associated regulating throttle, and wherein said piston slide valve is maintained in a central position by similar spring means acting on said first and second end faces.

35. An installation according to claim 32, further comprising a warning device connected to the flow divider and including means emitting a warning signal if the flow divider loses its equilibrium.

36. An installation for filling a plurality of fluid pressure reservoirs which supply different pressure cycles associated with automotive vehicle operations and the like; said installation comprising:
common filling pipe means leading to all of said reservoirs by way of a check valve means between said reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response in a pressure drop in at least one of the reservoirs,
wherein said return line means is in bypassing relationship to said reservoirs such that movement of said switching valve means to said blocking position results in increased pressure and consequent fluid supply in said filling pipe means leading to said reservoirs, and
wherein a warning device is provided at the switching valve means which includes means for emitting a warning signal in response to movement of the switching valve means to the blocking position.

37. An installation for filling a plurality of fluid pressure reservoirs which supply different pressure cycles associated with automotive vehicle operations and the like; said installation comprising:
common filling pipe means leading to all of said reservoirs by way of a check valve means between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response to a pressure drop in at least one of the reservoirs,
wherein said return line means is in bypassing relationship to said reservoirs such that movement of said switching valve means to said blocking position results in increased pressure and consequent fluid supply in said filling pipe means leading to said reservoirs, and
wherein a warning device is provided which includes means for emitting a warning signal in response to detected pressure changes in at least one of said reservoirs.

38. An installation for filling a plurality of fluid pressure reservoirs which supply different pressure cycles associated with automotive vehicle operations and the like; said installation comprising:
common filling pipe means leading to all of said reservoirs by way of a check valve member between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response to a pressure drop in at least one of the reservoirs,
wherein said return line means is in bypassing relationship to said reservoirs such that movement of said switching valve means to said blocking position results in increased pressure and consequent fluid supply in said filling pipe means leading to said reservoirs, and
wherein a warning device is provided at the switching valve means which can be switched into a readiness condition when the switching valve means is in a closed blocking position and which can be triggered by means of pick-up devices for the pressure differences in the reservoirs, if this difference is zero or negative.

39. An installation for filling a plurality of fluid pressure reservoirs which supply different pressure cycles associated with automotive vehicle operations and the like; said installation comprising:
common filling pipe means leading to all of said reservoirs by way of a check valve means between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response to a pressure drop in at least one of the reservoirs, wherein said return line means is in bypassing relationship to said reservoirs such that movement of said switching valve means to said blocking position results in increased pressure and consequent fluid supply in said filling pipe means leading to said reservoirs; and wherein at least one of said reservoirs supplies a brake cycle of an automotive vehicle, and wherein at least one other of said reservoirs supplies a vehicle suspension system.

40. An installation for filling a plurality of fluid pressure reservoirs which supply different pressure cycles associated with automotive vehicle operations and the like; said installation comprising:

common filling pipe means leading to all of said reservoirs by way of a check valve means between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response to a pressure drop in at least one of the reservoirs,
wherein said return line means is in bypassing relationship to said reservoirs such that movement of said switching valve means to said blocking position results in increased pressure and consequent fluid supply in said filling pipe means leading to said reservoirs, and wherein said reservoirs include separate reservoirs for vehicle braking cycles, for a vehicle suspension system, and for a vehicle power steering system.

41. An installation for filling a plurality of fluid pressure reservoirs which supply different pressure cycles associated with automotive vehicle operations and the like; and installation comprising:

common filling pipe means leading to all of said reservoirs by way of a check valve means between each reservoir and said filling pipe means,
storage tank means,
pump means for pumping fluid from said storage tank means to said filling pipe means,
return line means connected between said filling pipe means and said storage tank means,
switching valve means in said return line means for selectively blocking said return line means,
and control means for moving said switching valve means to a blocking position in response to a pressure drop in any one of the reservoirs.

* * * * *